June 15, 1965

P. KARNOW ETAL 3,189,127

UNIVERSAL WHEEL CHOCK

Filed July 30, 1963

INVENTORS
PAUL KARNOW
BLANCHARD S. HUTCHINS
BY Henry Hansen
ATTORNEY

June 15, 1965   P. KARNOW ETAL   3,189,127
UNIVERSAL WHEEL CHOCK
Filed July 30, 1963   2 Sheets-Sheet 2

INVENTORS
PAUL KARNOW
BLANCHARD S. HUTCHINS
BY
ATTORNEY

United States Patent Office 3,189,127
Patented June 15, 1965

3,189,127
UNIVERSAL WHEEL CHOCK
Paul Karnow, Glenside, and Blanchard S. Hutchins, Warrington, Pa., assignors to the United States of America as represented by the Secretary of the Navy
Filed July 30, 1963, Ser. No. 298,806
9 Claims. (Cl. 188—32)
(Granted under Title 35, U.S. Code (1952), sec. 266)

The invention described herein may be manufactured and used by or for the Government of the United States of America for governmental purposes without the payment of any royalties thereon or therefor.

This invention relates to wheel chock devices and is particularly concerned with adjustable chocks suitable for use with airplane wheels having pneumatic tires.

In the handling of aircraft aboard aircraft carriers wheel chocks are utilized to properly locate the aircraft and to secure the same against accidental movement by preventing the aircraft wheels from moving in either direction.

Heretofore wooden wheel chocks have been used and have been a constant source of trouble. Under the pressure of revving jet planes these chocks often break and shatter, strewing splinters and metal screws across flight decks. Such objects sucked into the air intake of jet engines have been known to cause major damage Also, the larger fragments hurled across flight decks under jet exhaust pressure have resulted in serious personnel injuries.

Due to the unusual configuration and nonsymmetrical design of the chock assemblies of the prior art and further due to the inadequate adjustment features thereof, such as removable pins, an undue length of time is taken by untrained personnel in the chocking operation. This is of particular significance in carrier operations where speed in securing and releasing the aircraft is essential. Furthermore, when chocks are used on lightly loaded aircraft, the conventional wheel chocks have been found to bind and to require an excessive amount of force to dislodge the same upon the subsequent loading of the aircraft, as with fuel. This factor also, of course, significantly slows down the launching operation.

Many of the prior art chocks are designed for use with a wheel of a particular diameter, whereas wheels of different diameters are found on the various aircrafts based on aircraft carriers. The utilization of this type of prior art chock would result in a reduction of efficiency and also to a serious condition of storage space.

Additionally, due to the pitching and rolling of the aircraft carrier, the aircraft chocked thereon have a tendency at times to bounce and engage the upper portion of the wheel chock device. With the conventional prior art chocking devices this exceedingly high load directed on the top or uppermost portion of the chocking device has resulted in the breaking and splintering of the wheel chock with the detrimental results mentioned above.

It is an object of the present invention to provide a simply constructed and quickly adjustable chock which is of rugged construction and which may be subjected to hard usage and abuse while still retaining the proper operational characteristics.

Another object of the present invention is to provide a lightweight and inexpensive chocking device which may be quickly interposed in the operating condition and which will lock any size aircraft wheel against movement, particularly aircraft parked on the pitching and rolling decks of aircraft carriers.

Still another object of the present invention is to provide a chocking device for aircraft wheels which will not splinter and litter carrier decks with flying lethal objects that can be ingested into aircraft carrier engines or can injure deck personnel.

Still another object of the present invention is to provide a positive means of locking a wheel securely, to render it irrotational and to rigidly hold an aircraft under full run-up power of propeller or jet engines without applying wheel brakes and to provide means which may be instantaneously removed from under the wheels of the aircraft.

Various other objects and advantages will appear from the following description of an embodiment of the invention and the novel features will be particularly pointed out hereinafter in connection with the appended claims.

Figure 1:
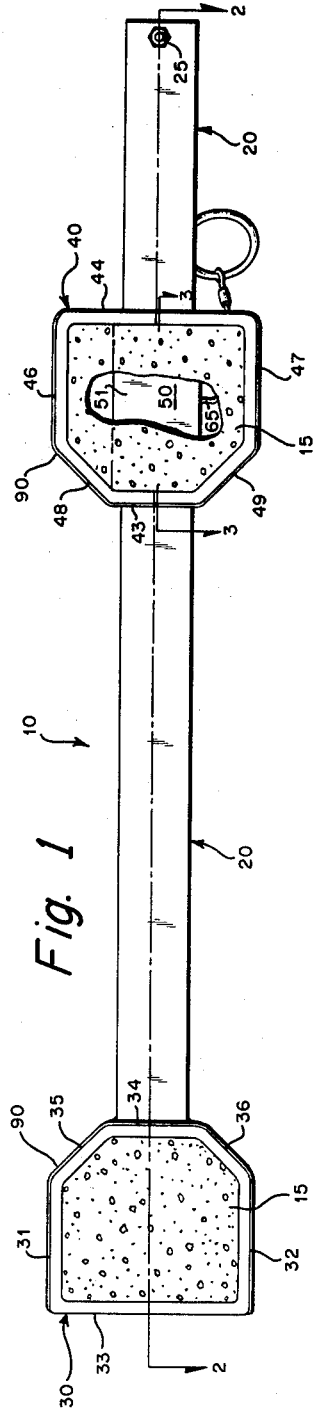
FIG. 1 illustrates the wheel chock assembly of the present invention in side elevation and in position to operatively engage an aircraft wheel.
Figure 2:
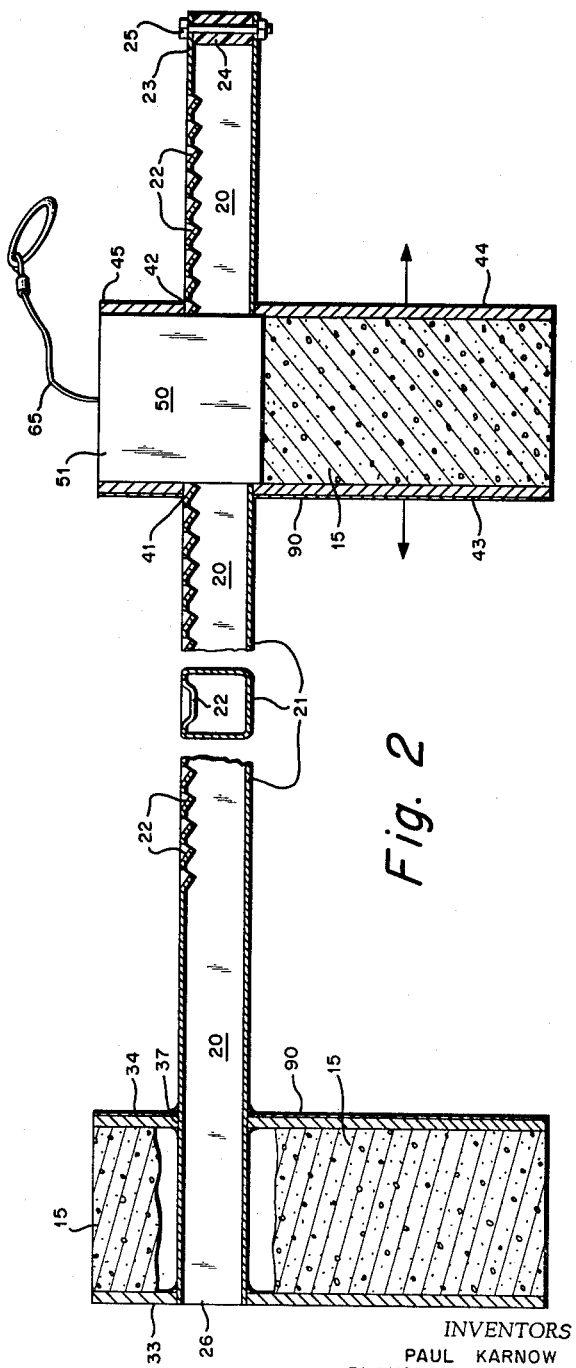
FIG. 2 illustrates a cross-sectional view of the wheel chock assembly taken along the line 2—2 of FIG. 1.

Referring to FIGS. 1 and 2, the wheel chock assembly generally noted at 10 is shown as comprising a rack unit 20 and a pair of end blocks or chocking members 30 and 40, the end blocks being substantially identical except for the latch assembly generally noted at 50 which is contained within the structure of the end block 40 and which will be discussed in greater detail below.

The rack unit 20 is formed of a hollow tubular member 21 of substantially square configuration which has a plurality of angular, equally spaced and integrally formed ratchet teeth 22 extending substantially the length of the tubular member 21 along one side thereof for engaging mating teeth on the latch assembly 50. Housed within the end 23 of the tubular member 21 is a phenolic block 24 which is secured thereto by bolt 25. The tubular member 21 is constructed of steel or other appropriate material of sufficient strength to withstand the high forces to which the rack unit 20 would be subjected.

Rigidly secured to the other end 26 of the rack unit 20 is an end block or chocking member 30 which is fastened by bolted angle brackets, welds, or the like. The end block 30 is formed of lightweight material such as an aluminum alloy or the like of sufficient strength to withstand the high forces to which it is subjected. The end block 30 is a longitudinally extending tubular member having its cross-sectional height greater than its cross-sectional width and comprising a pair of parallel, longitudinally extending support engaging or ground engaging surfaces 31 and 32. These surfaces 31 and 32 are interconnected at one end thereof by a longitudinally extending outer planar plate 33 which extends perpendicularly to the support engaging faces 31 and 32. The block 30 further comprises a narrow, longitudinally extending inner planar plate 34 which is parallel to outer plate 33 and which is interconnected with the support engaging surfaces 31 and 32 by similar wheel engaging plate members 35 and 36, respectively, these members inclined at an angle approximately 45° from the plane of plates 31 and 32. Aligned apertures 37 and 38 are formed intermediate the height of the outer planar plate 33 and inner planar plate 34 and are of square configuration for receiving the square tubular member 21.

End block 40 is substantially identical in configuration and orientation to end block 30 but in lieu of the fixed configuration of block 30 to rack unit 20, end block 40 is slidable by reason of rack receiving apertures 41 and 42 formed in the planar plates 43 and 44, respectively. At the end 45 of the block 40 a latch assembly 50 is secured within the confines of the tubular block 40 for engaging and adjustably connecting the block 40 to the rack unit 20.

As illustrated by the wheel chock assembly 10 of FIG. 1, the rack member 20 and blocks 30 and 40 are symmetrical about a horizontal plane extending through the midpoint of the height of the blocks 30 and 40 and rack member 20. This factor results in operational speed, since it is not necessary to determine which side of the device should be up and which side down.

Interposed within the confines of the tubular end blocks 30 and 40 and filling the same is a lightweight, high compressive strength material such as a foam cellular plastic material noted at 15 which is injected under pressure in a manner known in the prior art and which provides additional compressive strength to the end block shell without increasing the weight of the wheel chock assembly 10 to any appreciable or significant extent.

Surfaces 31, 32, 34, 35 and 36 of block 30 and equivalent surfaces 46, 47, 43, 48, and 49, respectively, on block 40 are coated with a non-slip compound 90, known in the art, for the purpose of increasing the frictional coefficient of these surfaces.

Figure 3:
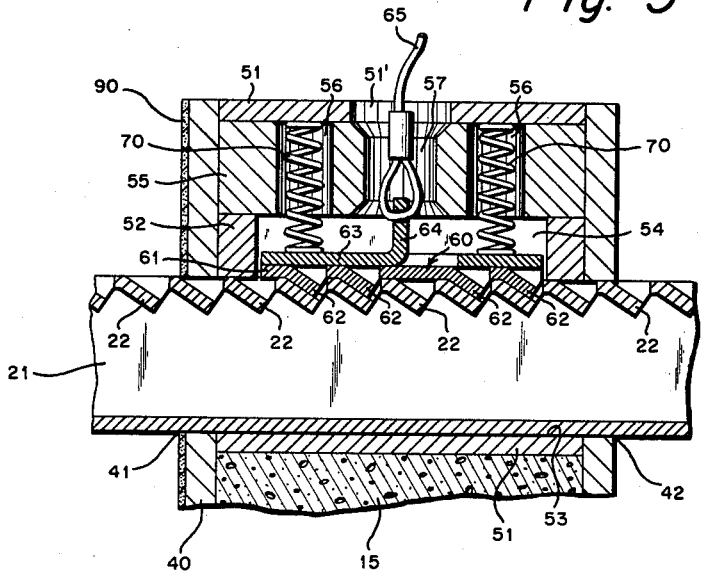
FIG. 3 illustrates a cross-sectional view of the latch mechanism taken along the line 3—3 of FIG. 1.

Referring now to FIG. 2, and more particularly to FIG. 3, the latch mechanism 50 includes an open ended rectangular housing 51 and a guide bar 52 secured along the interior perimeter of said rectangular housing 51 and extending across the open end portion of said rectangular housing to thereby form a tubular rack receiving portion 53 in registration with apertures 41 and 42 in end block 40 and a latch assembly area 54. A block member 55 is rigidly secured and seated between the guide member 52 and the wall of housing 51 and includes a pair of spring receiving apertures 56, and an external actuator aperture 57 which is in registraton with hole 51′ formed in housing 51.

Pawl member generally noted at 60 includes a lower plate 61 having angular teeth 62 formed therein for selective mating engagement with the angular ratchet teeth 22 of the tubular rack member 21. Plate 63 is rigidly secured to plate 61 and includes a tab 64 in registration with apertures 57 and 51′ and having actuator cord 65 secured thereto. A pair of compression springs 70 is interposed between the upper exposed portion of plate 63 and extend through the guide apertures 56 in block 55 and engage the wall of housing 51.

In operation, the compression springs 70 normally urge teeth 62 into engagement with ratchet teeth 22 of the tubular member 21 thereby precluding movable end block or chocking member 40 from moving outwardly relative to the fixed end block 30. When it is desired to adjust the end block 40, the operating cord 65 is pulled outwardly against the action of compression springs 70, thereby removing the teeth 62 and 22 from their interengaging relationship. When the teeth are removed from their engaging position the block 40 is slidable outwardly with respect to the end block 30. The latching operation may be obtained again by releasing the actuator 65.

Figure 4:
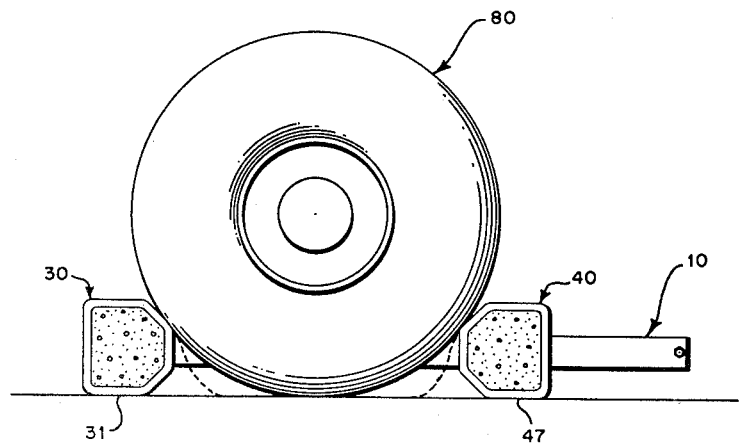
FIG. 4 is a schematic representation of the wheel chock in its operative condition with the aircraft wheel shown under no-load and at full load.

Referring now to FIG. 4, there is illustrated a schematic showing of the chock assembly 10 in its operative relationship with respect to an aircraft wheel 80. The solid line configuration of the aircraft wheel is illustrative of the relationship of parts when the aircraft is lightly loaded or under a no-load condition. The dotted line position of the aircraft wheel exists when the aircraft is placed in a full load condition at a time when the aircraft wheel has been previously chocked. It is to be noted that there is no significant force applied to the end blocks 30 and 40 which would preclude removal of the chocks from the aircraft's wheel. With each increasing unit of load applied to the chock normal to the supporting surface there is an equivalent component of force urging the chocks or end block members 30 and 40 to separate, which factor alleviates any deleterious binding condition which would preclude quick and efficient removal of the chocking device from the aircraft wheel.

It will be understood that various changes in the details, materials, steps and arrangement of parts which have been herein described and illustrated in order to explain the nature of the invention may be made by those skilled in the art within the principle and scope of the invention as expressed in the appended claims.

What is claimed is:

1. A symmetrical wheel chock assembly for rendering an aircraft wheel nonrotational, comprising:
   a plurality of spaced, parallel, elongated members each in cross section defining a hexagon having a relatively wide side surface and a spaced parallel relatively narrower side surface, spaced parallel top and bottom surfaces each extending from an opposite side edge of said wide side surface, inclined surfaces on each of said members, each joining said top and bottom surfaces with a respective opposite edge of said narrower side surface,
   a bar means connected to said narrow side surfaces intermediate the inclined surfaces to place said relatively narrow sides in interfacing and confronting relationship,
   and one of said elongated members being fixed to said bar means and the other of said elongated members selectively movable with respect to said bar means whereby an adjustable and symmetrical wheel chock assembly is formed which is speedily and efficiently operable.

2. A symmetrical wheel chock assembly for rendering an aircraft wheel nonrotational, comprising:
   a pair of spaced, parallel, elongated members, each member being of uniform transverse cross section along its length and defining a hexagon having a relatively wide side surface and a spaced parallel relatively narrower side surface, spaced parallel top and bottom surfaces each extending from an opposite side edge of said wide side surface, inclined surfaces on each of said members, each joining said top and bottom surfaces with a respective opposite edge of said narrow side surface,
   a bar means operatively connecting said relatively narrow side surfaces in interfacing and confronting relationship, said bar means being connected to said narrow side surfaces intermediate the inclined surfaces,
   and one of said elongated members being fixed to said bar means and the other of said elongated members being selectively movable with respect to said bar means whereby an adjustable and symmetrical wheel chock assembly is formed which is speedily and efficiently operable.

3. The chocking device of claim 1 further including:
   a latch means interconnected between said movable elongated member and said bar means for allowing movement of said movable elongated member with respect to said bar toward said other elongated member and for locking the same against movement with respect to said bar.

4. A symmetrical wheel chock assembly for rendering an aircraft wheel nonrotational, comprising:
   a pair of parallel, laterally spaced and complementary wheel engaging members,
   a tubular connecting bar for spacing and supporting said wheel engaging members,
   one of said wheel engaging members being rigidly secured to one end of said bar, the other of said wheel engaging members being movable with respect to said bar,
   each of said wheel engaging members further being of uniform transverse cross section along its length and defining a hexagon having a relatively wide side surface and a spaced parallel relatively narrower side surface, spaced parallel top and bottom surfaces each extending from an opposite side edge of said wide side surface, inclined surfaces on each of said members each joining said top and bottom surfaces with a respective opposite edge of said narrow side surface, and said tubular connecting bar operatively engaging said narrow faces of said wheel engaging members intermediate the inclined surfaces thereof whereby an adjustable and symmetrical wheel chock device is formed which is speedily and efficiently operable.

5. A symmetrical wheel chock assembly for rendering an aircraft wheel nonrotational, comprising:

a pair of parallel laterally spaced and complementary wheel engaging members, a tubular connecting bar for spacing and supporting said wheel engaging members, one of said wheel engaging members being rigidly secured to one end of said bar adjacent one end of said wheel engaging member, the other of said wheel engaging members being movable with respect to said bar and being engaged by the same at the end complementary to said one end of said rigidly secured wheel engaging member, each of said wheel engaging members further being of uniform transverse cross section along its length and defining a hexagon having a relatively wide side surface and a spaced parallel relatively narrower side surface, spaced parallel top and bottom surfaces each extending from an opposite side edge of said wide side surface, inclined surfaces on each of said members each joining said top and bottom surfaces with a respective opposite edge of said narrow side surface, said tubular connecting bar operatively engaging said narrow side surfaces of said wheel engaging members intermediate the inclined surfaces thereof, and latch means interconnected between said movable wheel engaging member and said tubular connecting bar for allowing movement of said movable wheel engaging member with respect to said bar toward said other wheel engaging member and for locking the same against movement with respect to said bar, whereby an adjustable and symmetrical wheel chock assembly is formed which is speedily and efficiently operable.

6. An adjustable wheel chock device for rendering aircraft wheels nonrotational, comprising:

a pair of wheel engaging members, a connecting means operatively engaging said wheel engaging member for maintaining the same in spaced relationship, said connecting means comprising a hollow tubular member of substantially square configuration and having ratchet teeth integrally formed on one side thereof, said wheel engaging members being of hollow tubular configuration and extending perpendicularly to said rack member and each comprising a pair of spaced, parallel, longitudinally extending ground engaging surfaces one edge of each being interconnected by a perpendicularly related longitudinally extending outer plate, each of said wheel engaging members further including a longitudinally extending front plate parallel to and narrower than said outer plate, said other ends of said ground engaging surfaces being connected to said narrow front plate by a pair of equal, angularly related, longitudinally extending wheel bearing plates, said outer plate and said front plate having aligned square apertures formed at the vertical center line thereof for receiving said rack member, one of said wheel engaging members being rigidly secured to said connecting means and the other of said members being movable with respect to said connecting means, and said movable member having a latch means therein for engaging said teeth on said rack member.

7. The adjustable wheel chock device of claim 4 wherein said latch means comprises:

an open ended rectangular housing having a guide strip means secured to the interior periphery of said housing for providing a tubular rack receiving area and a latch assembly area, plate means slidable within said latch assembly area having angularly extending teeth thereon for selective mating engagement with said ratchet teeth of said tubular member, said plate means further including a tab means for receiving an external actuator means, compression spring means interposed between said housing and said plate means for urging said teeth on said plate means into mating engagement with said teeth on said tubular member, and said housing having an aperture therethrough for permitting access to said tab means.

8. The adjustable wheel chock device of claim 1 wherein said plurality of elongated members are filled with a cellular plastic foam material.

9. The adjustable wheel chock device of claim 6 wherein said wheel engaging members are filled with a cellular plastic foam material.

References Cited by the Examiner

UNITED STATES PATENTS

| | | | |
|---|---|---|---|
| 2,771,162 | 11/56 | Marsh | 188—32 |
| 2,992,704 | 7/61 | Showker et al. | 188—32 |
| 3,010,540 | 11/61 | Dahlen | 188—1 |
| 3,104,085 | 9/63 | Sklandy | 188—32 X |

FOREIGN PATENTS 675,784  11/29  France.

ARTHUR L. LA POINT, *Primary Examiner.*

DUANE A. REGER, *Examiner.*